Oct. 22, 1957 M. LIEF 2,810,598
STORE DISPLAY FIXTURES
Filed July 11, 1956 3 Sheets-Sheet 1

*INVENTOR.*
MILTON LIEF
BY Alfred W. Petchaft
ATTORNEY

Oct. 22, 1957  M. LIEF  2,810,598
STORE DISPLAY FIXTURES
Filed July 11, 1956  3 Sheets-Sheet 2

INVENTOR.
MILTON LIEF
BY Alfred W Petchaft
ATTORNEY

Oct. 22, 1957 M. LIEF 2,810,598
STORE DISPLAY FIXTURES
Filed July 11, 1956 3 Sheets-Sheet 3

INVENTOR.
MILTON LIEF
BY
ATTORNEY

United States Patent Office 2,810,598
Patented Oct. 22, 1957

2,810,598
STORE DISPLAY FIXTURES
Milton Lief, Olivette, Mo., assignor to American Fixture, Inc., St. Louis, Mo., a corporation of Missouri Application July 11, 1956, Serial No. 597,188
4 Claims. (Cl. 287—119)

This invention relates in general to new and useful improvements in store display fixtures and, more particularly, to accessory fixtures forming a part thereof.

Store display fixtures are periodically changed to accommodate different types of merchandise and the accessory fixtures such as racks, bars, card holders, garment forms, and the like which are usually displayed thereon must also be changed. Since it is often necessary to change the set-up of such display fixtures quickly, it is desirable that the accessory fixtures be capable of rapid change or rearrangement without the necessity of employing skilled labor or the use of tools.

It is, therefore, the primary object of this invention to provide a store fixture assembly in which the accessory display fixtures may be changed quickly and easily without the necessity of employing skilled labor or tools.

It is another object of the invention to provide an accessory display fixture wherein a single type of fitting and upright member form an assembly which may be used with a variety of display devices.

It is also an additional object of the present invention to provide accessory display fixtures of the type stated in which the component parts can be quickly and easily connected or disconnected and will not seize or bind.

It is a further object of the present invention to provide an accessory display fixture consisting of a uniquely combined socket and upright so constructed that the upright will seat itself in true co-axial alignment with respect to the socket even when quickly or carelessly inserted.

Broadly speaking the present invention resides in the provision of an accessory display fixture including a socket having a tapered bore which is noncircular in cross section and is adapted to receive a rod-like upright member having an end portion formed with a taper having a cross-sectional shape matching the cross-sectional shape of the bore whereby the end portion of the upright member matingly engages the tapered bore of the fitting but can be easily removed and turned to various axially rotated positions or can be interchanged with similar components.

With the above and other objects in view, my invention resides in the novel features of form, construction, arrangement, and combination of parts presently described and pointed out in the claims.

In the accompanying drawings (three sheets)—

Figure 1:
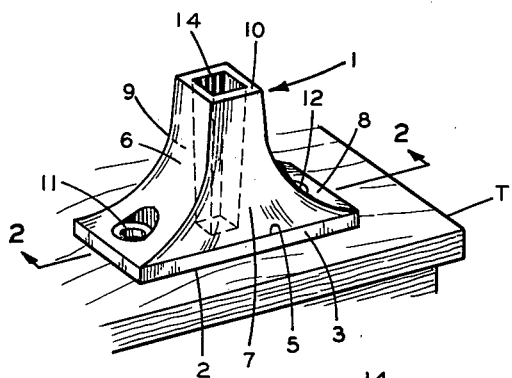
Fig. 1 is a perspective view of a display fixture fitting constructed in accordance with and forming a part of the present invention.

Referring now in more detail and by reference characters to the drawings, which illustrate practical embodiments of the present invention, Fig. 1 illustrates a display fixture fitting 1 integrally including a rectangular base 2 and short vertical side faces 3 terminating in the form of a rectangular edge portion 5. Commencing at the edge portion 5 and extending arcuately upwardly therefrom are concave side wall surfaces 6, 7, 8, and 9 which terminate in edge portions thereby forming a rectangular upper surface 10. Bored through the body of the fitting 1 and extending from the upper surface 10 through the base 2 is a square tapered bore 14 which tapers from upper surface 10 to base 2. Drilled or otherwise formed in the side walls 6, 8 are bolt or screw-receiving holes 11, 12. Suitable screws or bolts 13 passing through holes 1, 12 may be employed to secure the fitting 1 to a table T or the like.

Referring now to Figs. 11–14, an upright member is generally designated at 15 and is provided with a cylindrical shank portion 16, a conically tapered upper end portion 17, and lower end portion 18 formed with four spaced symmetrically arranged flat surfaces 19, 20, 21, 22, respectively, tapering toward and terminating in a chamfered edge portion 23. The degree of taper of the surfaces 19, 20, 21, 22 is the same as the taper of the bore 14 so that said surfaces 19, 20, 21 22 of the lower end portion 18 of the upright 15 will matingly engage the tapered bore 14.

Figure 3:
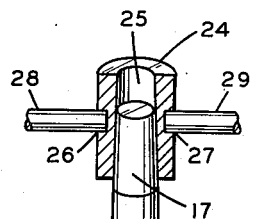
Fig. 3 is a perspective view, partly broken away and in section, of the fitting shown in Fig. 2 with an upright and top fitting in position.
Figure 4:
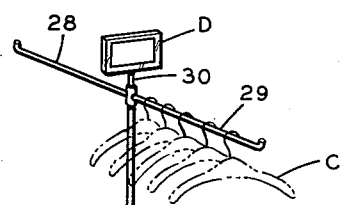
Fig. 4 is a perspective view of a display fixture incorporating the fitting of Fig. 1.

In Fig. 3 the upright 15 is shown to be positioned in the fitting 1 with the tapered surfaces on the upright 15 engaging the tapered surfaces of the bore 14. It will be noted that lower end portion 18 of the upright 15 is of shorter length than that of the passageway 14. This construction permits a snug fit between the tapered surfaces of upright 15 and bore 14. Fitted over the conically tapered upper end portion 17 is a top fitting 24 having a bore 25 conically tapered so as to matingly engage the upper end portion 17. Socketed in the top fitting at 26, 27 are opposed rods 28, 29 which may be used to support garment hangers C, or the like, as illustrated in Fig. 4. If desired, a card and holder D indicating the price of the articles or other like information may be provided with a tubular element 30 which is adapted to be positioned into bore 25 of the top fitting 24.

Figure 2:
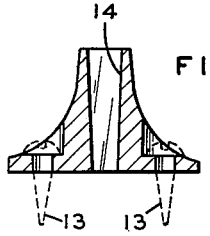
Fig. 2 is a sectional view of the fitting taken along line 2—2 of Fig. 1.
Figure 5:
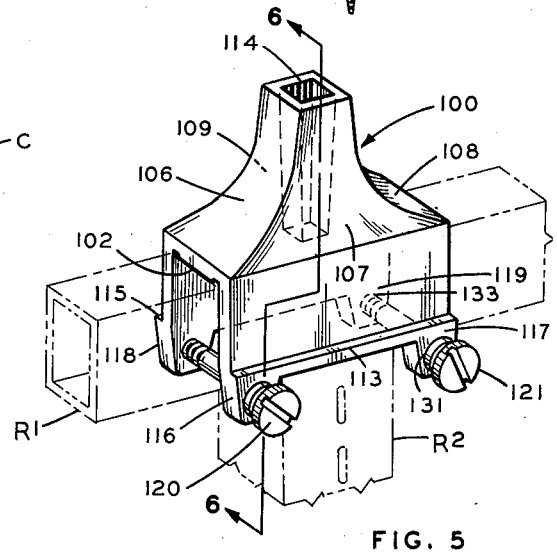
Fig. 5 is a perspective view of a modified form of an accessory display fixture fitting embodying the present invention.
Figure 6:
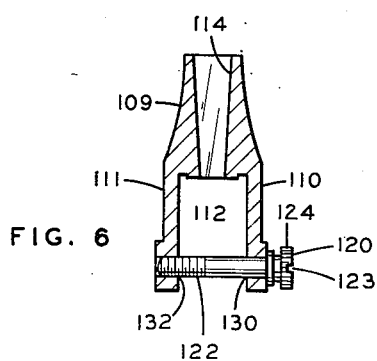
Fig. 6 is a sectional view of the fitting taken along line 6—6 of Fig. 5.
Figure 7:
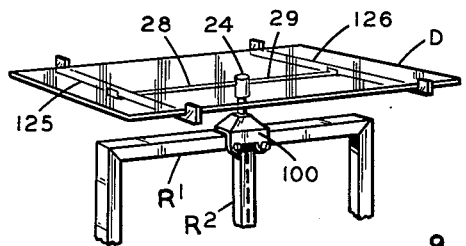
Fig. 7 is a perspective view of an accessory display fixture embodying the present invention.

Referring now to Figs. 5–7 wherein a modified form of the invention is illustrated, the fixture fitting 100 is formed with concave side walls 106, 107, 108, 109, a square tapered bore 114 adapted to receive the lower portion 18 of the upright 15, and a base portion 102, all similar to that shown in Figs. 1 and 2. Formed integrally with the base portion and depending therefrom is a pair of opposed spaced parallel side plates 110, 111, which form, with the base 102, a slot 112 adapted to receive a rail $R^1$. The lower portions 113, 115 of the side plates 110, 111 provide a thickened or reinforced portion from which four ears 116, 117, 118, 119 depend. Ears 116, 117 are provided with smooth bore holes 130, 131, adapted to receive the shanks of bolts 120, 121, respectively, while ears 118, 119 are tapped as at 132, 133 to form threaded holes aligned with holes 130 and 131, respectively, to receive the threaded portion 122 of the bolts. The bolts are suitably provided with slots 123 for the reception of a coin or screwdriver and a knurled portion 124 which permits the screw to be manipulated by hand if desired. This form of the invention permits the fitting 100 to be selectively positioned at any point along a supporting frame or rail $R^1$ by merely loosening the bolts 120, 121, moving the fitting to the desired position and then tightening the bolts. In actual operation, however, it is preferable to position the fitting 100 so that it is at the junctioin of the rails $R^1$, $R^2$ in the manner shown in Figs. 5 and 7. A flat surfaced display top D as shown in Fig. 7 may be supported by the bracket 100 when asid bracket is employed with a top fitting 24, and opposed rods 28, 29, similar to that shown in Fig. 3. In addition, supplementary U-shaped brackets 125, 126 suitably secured to rods 28, 29 may be provided in order to properly position the display.

Figure 8:
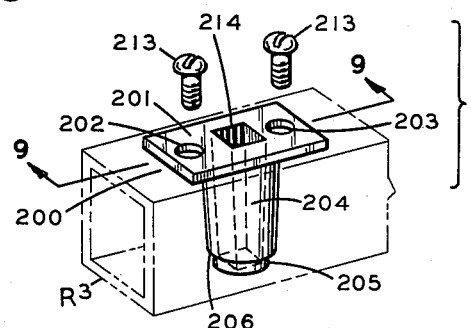
Fig. 8 is a perspective view of another modified form of a display fixture fitting embodying the present invention.
Figure 9:
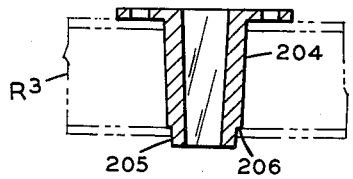
Fig. 9 is a sectional view taken along line 9—9 of Fig. 8.
Figure 10:
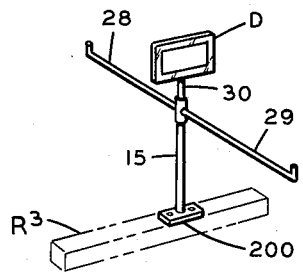
Fig. 10 is a perspective view of an accessory display fixture embodying the modified form of the present invention.
Figure 13:
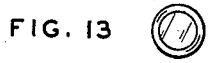
Figs. 13 and 14 are top and bottom plan views, respectively, of the upright member of Fig. 11.
Figure 12:
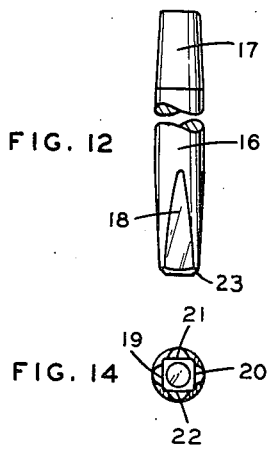
Fig. 12 is a side elevational view of the upright member of Fig. 11.
Figure 14:
Figure 11:
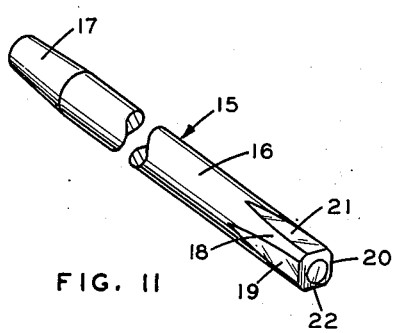
Fig. 11 is a perspective view of an upright member forming a component element of accessory display fixtures embodying the present invention.
Figure 15:
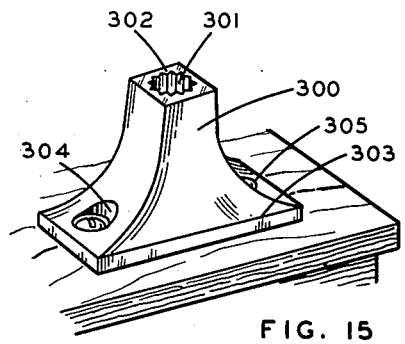
Fig. 15 is a perspective view of a further modified form of display fixture fitting embodying the present invention.
Figure 16:
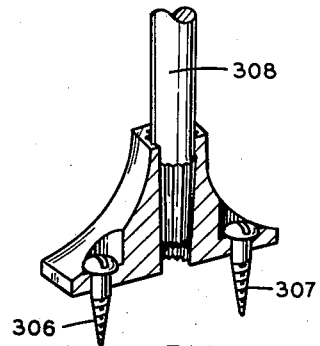
Fig. 16 is a perspective view, partly broken away and in section, of the modified form of fitting shown in Fig. 15 with a companion-shaped upright in operative position therein.
Figure 17:
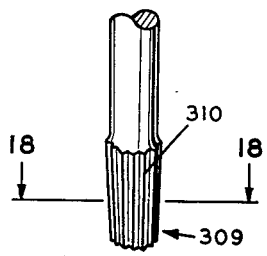
Fig. 17 is a fragmentary elevational view of the upright shown in Fig. 16.
Figure 18:
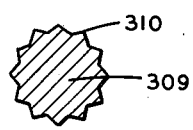
Fig. 18 is a sectional view taken along line 18—18 of Fig. 17.
Figure 19:
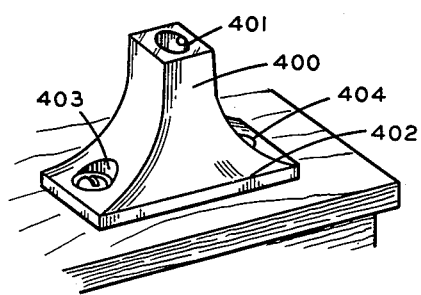
Fig. 19 is a perspective view of another modified form of display fixture fitting embodying the present invention.
Figure 20:
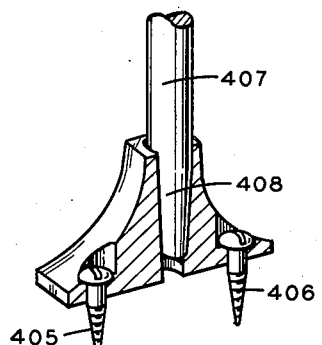
Fig. 20 is a perspective view, partly broken away and in section, of the modified form of fitting shown in Fig. 19 with a companion-shaped upright in operative position therein.
Figure 21:
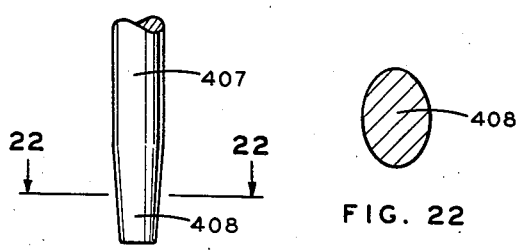
Fig. 21 is a fragmentary elevational view of the upright shown in Fig. 20.
Figure 22:
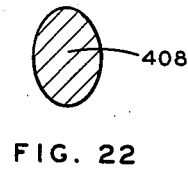
Fig. 22 is a transverse sectional view taken along line 22—22 of Fig. 21.

Referring now to Figs. 8–10 which illustrate another form of the invention, a fitting generally designated as 200 is provided with a square tapered bore 214 passing completely through the body of the fitting and similar in shape to bore 14 of Fig. 1. The fitting is provided with an upper plate-like member 201 suitably formed with a pair of holes 202, 203, for receiving conventional screws 213, a substantially cylindrical body element 204 and a reduced substantially cylindrical end portion 205 forming a step or shoulder 206. In use the fitting 200 is preferably secured by screw 213 on a hollow tubular rail $R^3$ of rectangular cross section, similar to that shown in Figs. 8–10, such that the plate-like member 201 abuts one outside surface of the rail and the shoulder portion 206 engages an inside surface of the rail in the manner shown in Fig. 9. The manner of using the fitting 200 is shown in Fig. 10 wherein a fitting 200 is secured to the rail $R^3$. Upright 15, rods 28, 29, 30 and card holder D are related to fitting 200 and to each other in the same manner as the corresponding elements in Figs. 3 and 4. In this connection it should also be noted that the fittings of the present invention, such as the fitting 200, can be applied to round tubing as well as the square tubing $R^3$ shown in Fig. 8.

Referring now to Figs. 15–18 which illustrate another form of the invention, 300 designates a fitting having a conically tapered bore 301, the interior surface of which is provided with axial serrations 302 of V-shaped cross-section. At its lower end the fitting is formed with an integral base 303 having holes 304, 305 for receiving screws 306, 307, respectively. Provided for removable disposition within the bore 301 is a rod-like upright 308 which is swaged at its lower end to provide a conical taper 309 having axial serrations 310 of V-shaped cross-section to match the serrations 302. This type of fitting 300 and companion-shaped upright 308 are also fully interchangeable and will release quickly without binding. Furthermore, the upright 308 can be lifted out and axially rotated into many different adjustments as circumstances may require. Such fittings and uprights, of course, can be used in any of the same combintaions heretofore described in connection with other embodiments of the present invention.

Referring now to Figs. 19 to 22 which illustrate another form of the invention, 400 generally designates a fitting having a smooth surfaced tapered bore 401 of elliptical cross-sectional shape. At its lower end the fitting 400 is formed with an integral base 402 having holes 403, 404, for receiving screws 405, 406, respectively. Provided for removable disposition within the bore 401 is a rod-like upright 407 formed at its lower end with a smooth surfaced taper 408 having an elliptical cross-sectional shape matching the shape of the bore 401. This type of fitting 400 and companion-shaped upright 407 are similarly interchangeable and will release without binding. Furthermore, the upright 407 can be lifted up and reversed or axially rotated through 180° so as to be capable of adjustment into two alternate positions within the fitting 400. Such fittings and uprights can likewise be used in any of the same combinations heretofore described in connection with other embodiments of the present invention.

It should be understood that changes and modifications in the form, construction, arrangement, and combination of the several parts of the store display fixture may be made and substituted for those herein shown and described without departing from the nature and principle of my invention.

Having thus described my invention, what I claim and desire to secure by Letters Patent is:

1. An accessory display fixture comprising a fitting having a body portion formed with a bore, said bore being of polygonal cross-section and having a plurality of flat faces tapering toward one end of the fitting, and an elongated rod having a shank portion of substantially circular cross-section said rod including an end portion formed with the same number of converging flat faces as the bore for matingly engaging said faces of the bore in the fitting, said flat faces on the end portion of the rod being separated by arcuate segments which are continuations of the surface of the shank portion of the rod.

2. An accessory display fixture comprising a fitting having a body portion formed with a bore, said bore being of square cross-section and having four flat faces tapering toward one end of the fitting, and an elongated rod having a shank portion of substantially circular cross-section said rod including an end portion formed with four spaced symmetrically arranged converging flat faces which matingly engage the flat faces of the bore in the fitting, said flat faces on the end portion of the rod being separated by arcuate segments which are continuations of the surface of the shank portion of the rod.

3. An accessory display fixture as defined in claim 1 wherein the opposite end portion of the rod is formed with a conically tapered surface of substantially circular cross-section, and a top fitting provided with a complementarily shaped socket being adapted to fit upon said last named conically tapered surface.

4. An accessory display fixture as defined in claim 1 wherein the fixture is provided with means for slidably engaging a rail.

References Cited in the file of this patent

UNITED STATES PATENTS

| | | |
|---|---|---|
| 250,012 | Springstein | Nov. 22, 1881 |
| 656,583 | Levin | Aug. 21, 1900 |
| 1,337,205 | Dingman | Apr. 20, 1920 |
| 1,394,070 | Diffany | Oct. 18, 1921 |
| 1,813,398 | Griesemer | July 7, 1931 |
| 2,576,067 | Chandler | Nov. 20, 1951 |